April 9, 1957   J. A. JACKSON   2,788,474
RECTIFIER ASSEMBLY
Filed Sept. 10, 1953   2 Sheets-Sheet 1

WITNESSES:
John E. Healy
Wm. L. Groome

INVENTOR
James A. Jackson
BY
ATTORNEY

April 9, 1957  J. A. JACKSON  2,788,474
RECTIFIER ASSEMBLY
Filed Sept. 10, 1953  2 Sheets-Sheet 2
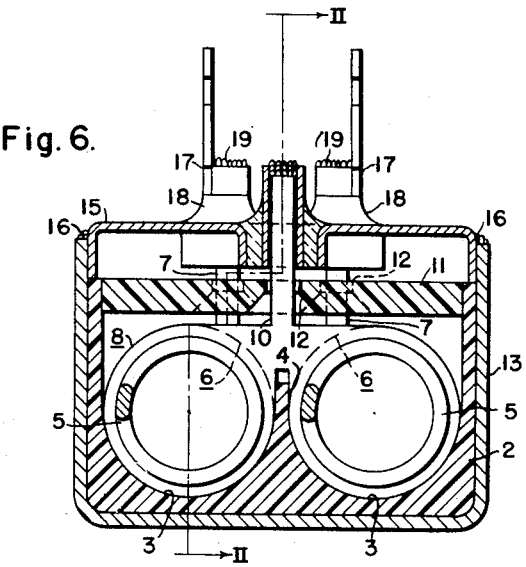
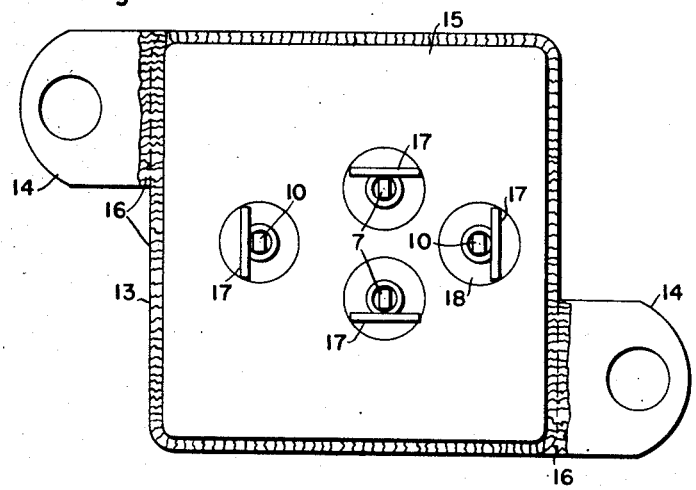
WITNESSES:
John E. Hensley
Wm. C. Groome
INVENTOR
James A. Jackson.
BY
ATTORNEY

United States Patent Office 2,788,474
Patented Apr. 9, 1957

2,788,474

RECTIFIER ASSEMBLY

James A. Jackson, Brunson, S. C., assignor to Westinghouse Electric Corporation, East Pittsburgh, Pa., a corporation of Pennsylvania Application September 10, 1953, Serial No. 379,429

4 Claims. (Cl. 317—234)

The present invention relates to rectifier assemblies and, more particularly, to a hermetically sealed assembly of rectifier cells of the semi-conductor type, such as selenium rectifiers.

The principal object of the invention is to provide a hermetically sealed rectifier assembly which can easily and quickly be assembled, and which is readily adaptable for any desired rectifier circuit.

Another object of the invention is to provide a rectifier assembly in which the rectifier cells are supported in an insulating container which permits arrangement and connection of the cells in substantially any desired rectifier circuit, and which is enclosed in a sealed metal case with terminal devices sealed in the case.

More specifically, a rectifier assembly is provided in which the rectifier cells are disposed in stacks in a box-like insulating container and connected in any desired rectifier circuit by contact members engaging either cells in one stack or cells in a plurality of stacks, with flexible leads extending from the contact members, the container being closed by a cover which has openings for guiding the flexible leads into a desired position, and with a sealed case enclosing the container and having terminal devices sealed in the case and connected to the leads.

Other objects and advantages of the invention will be apparent from the following detailed description, taken in connection with the accompanying drawings, in which:

Fig. 6 is a transverse, sectional view approximately on the line VI—VI of Fig. 2; and Fig. 7 is a top plan view of the complete assembly.

Figure 1:
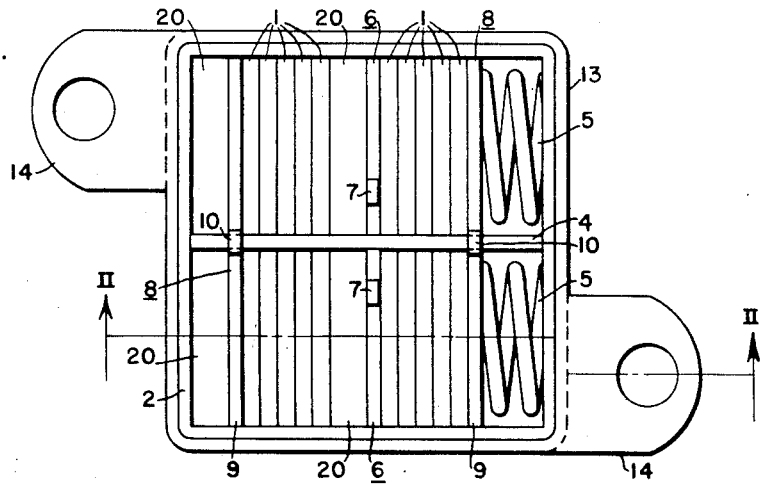
Fig. 1 is a top plan view of the rectifier assembly with the top of the case removed.

The drawing shows an illustrative embodiment of the invention in a rectifier device comprising a plurality of rectifier cells 1. The rectifier cells 1 may be selenium rectifiers, or they may be any other type of semi-conductor rectifiers, and may be of any usual or desired construction. The cells 1 may, for example, consist of a nickel-plated aluminum base plate on which is applied a layer of selenium, with a thin barrier layer of cadmium sulphide on the selenium, and a counterelectrode of a cadmium-tin alloy applied over the barrier layer. Such rectifiers are well known in themselves, and any rectifier cells of this general type may be used in the assembly.

The rectifier cells 1 are contained in a generally box-like insulating container 2. The container 2 may be molded from any suitable plastic insulating material and is shown in the drawings as being formed with two parallel grooves 3, separated by a central partition 4 extending from end to end of the container 2. A container having two parallel grooves 3 has been shown for the purpose of illustration, but if desired, the container 2 might have only a single groove, or it might have three or more grooves, depending on the number of rectifier cells and the circuit arrangement to be used. The grooves 3 are made to conform in cross-sectional shape and dimensions to the particular rectifier cells 1 which are to be used. Thus, in the illustrated embodiment shown in the drawings, the grooves 3 are substantially semi-circular in cross-section to receive circular rectifier cells, but it will be understood that if square or rectangular cells were to be used, the grooves 3 would be given a corresponding configuration.

Figure 3:
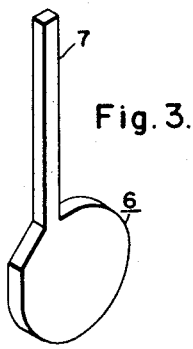
Figs. 3 and 4 are perspective views of two types of contact members.
Figure 4:
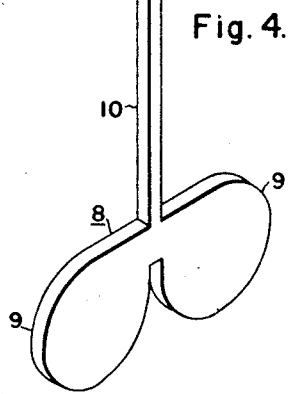

The rectifier cells 1 are disposed in stacks in the grooves 3 and are held in place, and in firm contact with each other, by helical compression springs 5 placed between the ends of the stacks and the end of the container 2. Electrical connection to the rectifier cells is made by means of contact members inserted at the appropriate places in the stacks. Two types of contact members are utilized. The contact members 6, shown in Fig. 3, consist of disc-like members, conforming approximately in shape and size to the rectifier cells, with integral, flexible leads 7 extending from them. The contact members 8, shown in Fig. 4, comprise two contact elements 9 which are integrally connected together as shown, and which conform approximately to the size and shape of the rectifier cells, and a single, integral, flexible lead 10 extends from the contact elements 9. The contact members 6 and 8 may be punched from sheet copper, or otherwise formed from conducting material, and are made thin enough so that the leads 7 and 10 are relatively flexible but thick enough to have sufficient current-carrying capacity. The contact members 8 have been shown as having two contact elements 9 for use with a two-stack assembly, as shown in the drawings, but it will be understood that if three or more stacks of rectifier cells were utilized, the contact members 8 would be provided with a corresponding number of contact elements joined together in the manner shown and having a common lead 10.

Figure 5:
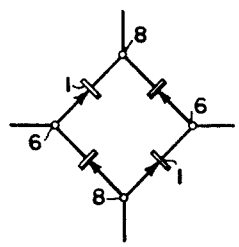
Fig. 5 is a schematic diagram of a typical rectifier circuit.

The rectifier cells 1 are disposed in stacks, as described above, in the container 2, and contact members 6 and 8 are placed in the stacks at the appropriate points to effect the proper electrical connections to provide the desired rectifier circuit. Metal spacers 20 may be inserted in the stacks, if necessary, in order to position the contact members near the desired locations or to facilitate making the connections. In the illustrative embodiment shown in the drawings, the rectifier cells 1 are connected in a single-phase, full-wave, bridge circuit, as shown in Fig. 5, and to obtain this connection, two of the connectors 8 are used placed at opposite ends of the stacks to provide common leads to both rectifier stacks at both ends. Contact members 6 are inserted at intermediate points in each stack to effect connection between the legs of the bridge circuit, and it will be evident that the resulting electrical connection is as shown in Fig. 5. Obviously, the rectifier cells can be arranged and connected in any desired rectifier circuit by proper arrangement of the cells and proper disposition of the contact members.

Figure 2:
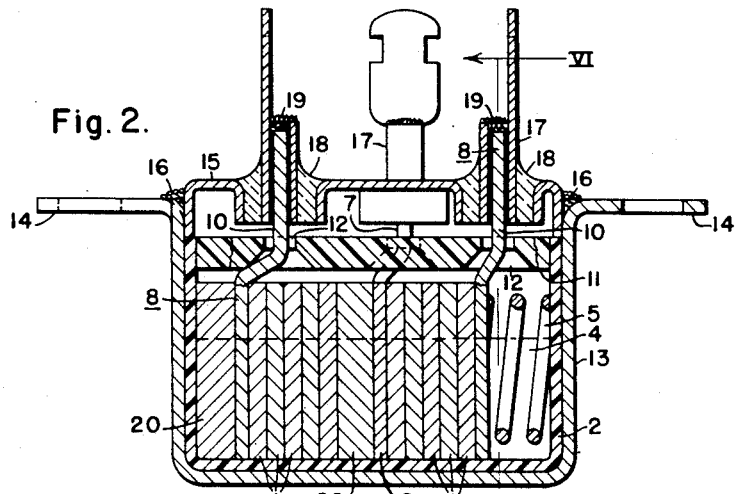
Fig. 2 is a longitudinal, sectional view approximately on the line II—II of Figs. 1 and 6.

The container 2 is closed by a cover member 11 which also serves as a guide for the leads 7 and 10. The cover member 11 may be molded of the same insulating material as the container 2 and fits snugly in the open top of the container. The cover member 11 is provided with openings 12 for the leads, the openings being located to position the leads in a desired manner. The openings 12 are preferably beveled on the lower side, as clearly shown in Fig. 2, to facilitate insertion of the leads through them.

The container 2 and cover 11 are enclosed in an outer metal case 13 which may be provided with ears 14 to facilitate mounting the device. The case 13 has a top or closure member 15 which fits into the case 13 and may be soldered to it, as indicated at 16, or otherwise hermetically sealed to provide a completely sealed enclosure. The top 15 is provided with terminal devices 17 equal in number to the number of leads 7 and 10. The terminal devices 17 are preferably tubular and are sealed in the top 15 by means of a glass seal 18, the terminals, and preferably also the top 15 being made of a metal which makes an effective hermetic seal with glass. The leads 7 and 10 extend into the hollow terminals 17 and are soldered to them, as indicated at 19.

It will be seen that a relatively simple device is provided which can readily be assembled. In the assembly of this device, the rectifier cells 1, spacers 20, and contact members 6 and 8 are placed in the container 2 and held in position by the springs 5. The assembly can then be tested electrically before it is closed, and any defective cells can be replaced, or other faults corrected, at this time with a minimum of difficulty and expense. After testing, the leads 7 and 10 are passed through the corresponding openings 12 in the cover 11, and the cover is put in place, closing the container 2. The holes in the cover 11 guide the leads 7 and 10 into definite predetermined positions corresponding approximately to the positions of the terminal devices 17, thus facilitating the further assembly of the device. It will be understood that the leads 7 and 10 are sufficiently flexible to be guided in this way by the cover, but are stiff enough to be readily inserted in the tubular terminals 17. After the cover 11 is in place, the top 15 is placed over the cover 11 with the leads extending into the terminals, and the entire assembly is placed in the case 13. The top 15 is then soldered to the case 13 around its edge to seal the case, and a drop of solder is placed in each of the tubular terminals 17 to positively connect the leads to the terminals and to seal the terminal openings.

It should now be apparent that a rectifier assembly has been provided which has many advantages. The assembly is readily adaptable to any type of rectifier circuit by proper arrangement of the cells and connectors, and may be made to accommodate any necessary number of rectifier stacks by providing the proper number of grooves in the container 2. The assembly is relatively simple and can be easily and quickly produced, and the construction permits electrical testing of the device before it is completed so that any defects can be corrected with a minimum of difficulty. The complete unit is hermetically sealed so as to be moistureproof and is enclosed in a durable metal case, the rectifier cells and leads being insulated from the case by the insulating container 2, cover 11 and the glass seals. The use of the cover 11 also greatly facilitates assembly of the device since it acts as a guide to position the leads so that the terminal devices 17 can be placed on the leads without difficulty.

A preferred embodiment of the invention has been shown and described for the purpose of illustration, but it will be apparent that various other embodiments and modifications are possible within the scope of the invention, and it is to be understood that the invention is not limited to the specific details of construction shown, but in its broadest aspects, it includes all equivalent embodiments and modifications.

I claim as my invention:

1. A rectifier assembly comprising an insulating container, a plurality of rectifier cells supported in said container, contact members disposed in contact with certain of the rectifier cells, said contact members having leads extending therefrom, an insulating cover member fitting in the container, the cover member having openings therein and the leads extending through the openings, a case enclosing the container and cover, the case including a closure member sealed thereto, a plurality of terminal devices sealed in said closure member, said openings in the cover member being located to position the leads in predetermined relation to the terminal devices, and the leads extending to the terminal devices and being connected thereto.

2. A rectifier assembly comprising a generally box-like insulating container, said container having grooves therein for receiving rectifier cells, a plurality of rectifier cells disposed in stacks in said grooves, contact members in contact with certain of said rectifier cells, said contact members having flexible leads extending therefrom, an insulating cover member fitting in the container, the cover member having openings therein and the leads extending through the openings, a case completely enclosing the container and cover, and a plurality of terminal devices on the case, said openings in the cover member being located to position the leads in predetermined relation to the terminal devices, and the leads being connected to the terminal devices.

3. A rectifier assembly comprising a generally box-like insulating container, said container having grooves therein for receiving rectifier cells, a plurality of rectifier cells disposed in stacks in said grooves, spring means in the grooves engaging the stacks of rectifier cells, contact members in contact with certain of said rectifier cells, said contact members having flexible leads extending therefrom, an insulating cover member fitting in the container, the cover member having openings therein and the leads extending through the openings, a case enclosing the container and cover, the case including a closure member sealed thereto, a plurality of terminal devices sealed in said closure member, said openings in the cover member being located to position the leads in predetermined relation to the terminal devices, and the leads extending to the terminal devices and being connected thereto.

4. A rectifier assembly comprising a generally box-like insulating container, said container having a plurality of parallel grooves therein, a plurality of rectifier cells disposed in stacks in said grooves, spring means in the grooves engaging the stacks of rectifier cells, a plurality of single contact members each disposed in contact with a rectifier cell in one of said stacks, at least one multiple contact member having portions in contact with rectifier cells in a plurality of stacks, each of said contact members having a flexible lead extending therefrom, an insulating cover member fitting in the container, the cover member having openings therein and the leads extending through the openings, a case enclosing the container and cover, the case including a closure member sealed thereto, a plurality of terminal devices sealed in said closure member, said openings in the cover member being located to position the leads in predetermined relation to the terminal devices, and the leads extending to the terminal devices and being connected thereto.

References Cited in the file of this patent

UNITED STATES PATENTS

| 1,905,525 | Strobel | Apr. 25, 1933 |
| 2,314,104 | Richards et al. | Mar. 16, 1943 |

FOREIGN PATENTS

| 616,165 | Great Britain | Jan. 18, 1949 |